United States Patent [19]
Mowery

[11] 3,773,290
[45] Nov. 20, 1973

[54] CLAMPING DEVICE FOR A FLEXIBLE HOSE

[75] Inventor: James E. Mowery, Delavan, Wis.

[73] Assignee: Sta-Rite Industries, Inc., Delavan, Wis.

[22] Filed: June 1, 1971

[21] Appl. No.: 148,337

[52] U.S. Cl. ............... 251/9, 24/134 R, 24/134 P, 24/249 R
[51] Int. Cl. ............................................. F16k 7/06
[58] Field of Search ........................... 251/4, 6–10; 24/134, 248 A, 248 BB, 248 JE, 248 CR, 170, 191, 249, 254, 252 J; 16/171; 339/239, 274

[56] References Cited
UNITED STATES PATENTS

| | | | |
|---|---|---|---|
| 3,226,763 | 1/1966 | Jonas | 16/171 |
| 1,032,664 | 7/1912 | France | 251/9 |
| 1,926,975 | 9/1933 | Endsor | 24/134 |
| 2,804,092 | 8/1957 | Aitchison | 251/9 X |
| 3,189,038 | 6/1965 | Von Pechmann | 251/6 X |
| 3,330,526 | 7/1967 | Berney | 251/9 |

Primary Examiner—Martin P. Schwadron
Assistant Examiner—Richard Gerard
Attorney—Andrus, Sceales, Starke & Sawall

[57] ABSTRACT

There is disclosed a clamping device for compressing a flexible hose to preclude flow therethrough. The clamping device includes a channel-section base member and an actuating member operable relative to the base member. The clamping end portion of the actuating member generally extends between the opposed triangular flanges of the base member and is provided with opposed transversely aligned projections which are engageable within transversely aligned slots of the base member flanges. The apex portion of the triangular flanges flare outwardly to not only facilitate the assembly of the device, but also enable the clamping device to be machine assembled. During assembly the actuating member projections are brought into contact with the flared portions of the base member flanges so that with application of pressure between the base member and actuating member the flanges are forced to elastically spread apart to enable the projections to slide over the corresponding flared portions of the flanges and engage within the opposed slots.

3 Claims, 6 Drawing Figures

PATENTED NOV 20 1973  3,773,290

INVENTOR.
JAMES E. MOWERY
BY
Andrus, Sceales, Starke & Sawall
ATTORNEYS

CLAMPING DEVICE FOR A FLEXIBLE HOSE

BACKGROUND OF THE INVENTION

This invention relates to improvements in clamping devices for shutting off or precluding flow through a flexible hose or tubing.

Bag-box containers have become increasingly popular for the distribution of certain liquid products such as acids, oils, syrups, etc. Such containers generally comprise a collapsible bag of suitable plastic material for containing the liquid product and which is encased in a box generally made of cardboard which protects the bag and is nicely stackable for storage. Such containers are disposable when empty and have in some instances replaced returnable containers when the latter proved uneconomic.

The liquid contents of the bag-box container is generally withdrawn through a length of flexible hose of tubing connected to the bottom of the collapsible bag. While the hose or tubing is initially sealed to protect the liquid contents, a hose clamp is further provided. After the bag-box container is placed in service and the initial hose or tubing seal is broken to permit withdrawal of the liquid contents, the hose clamp is thereafter available if and when necessary as a shut off device. The hose clamp is ordinarily disposed of with the container when the liquid contents of the bag is depleted.

Since the hose clamp of this invention forms a part of a disposable unit, it must be relatively inexpensive and capable of machine assembly onto the hose or tubing of a bag-box container. Preferably the clamp is operable with one hand making the other hand of the operator available for other chores. The hose clamp of this invention clearly meets at least all of the foregoing objectives.

SUMMARY OF THE INVENTION

According to the invention, the clamping device comprises a channel-section base member having opposed, generally triangular flanges connected by a web portion and being adapted to receive a flexible hose therein. Each of the opposed flanges is provided with a slot with the respective slots being transversely aligned. The aligned slots are spaced a given distance from the apex of the corresponding triangular flange and extend generally normal to the web portion of the hose member. An actuating member is operatively disposed relative to the base member. The clamping end portion of the acting member extends generally between the flanges of the base member and is provided with opposed, generally transversely aligned projections engageable within the corresponding slots of the base member flanges. The actuating member projections are movable within the opposed slots with actuation of the actuating member relative to the base member to selectively clamp and unclamp the flexible hose. The base member flanges have an outwardly flared portion extending generally between the slot and the corresponding apex thereof. During assembly of the clamping device the actuating member projections are intitially brought into contact with the flared portions of said flanges, and thereafter with an application of pressure between the actuating member and base member flanges are forced to elastically spread apart to enable the projections to slide over the corresponding flared portions of the flanges and engage within the opposed slots. The surface of the base member web portion on the side opposite from the hose channel is generally flat and may be brought to bear against any suitable adjacent surface to stabilize the clamping device during operation thereof.

DESCRIPTION OF THE DRAWING FIGURES

The drawings furnished herewith illustrate the best mode presently contemplated for carrying out the invention and described hereinafter.

DESCRIPTION OF THE ILLUSTRATED EMBODIMENTS

Figure 1:
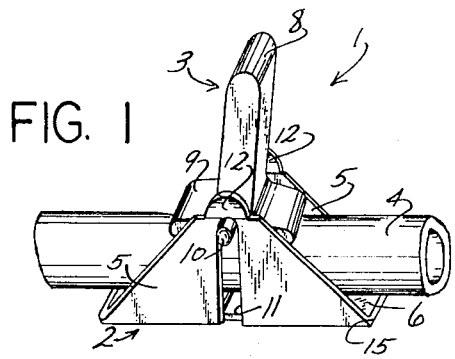
FIG. 1 is a perspective view of a hose clamp according to this invention.

Referring to the drawings, the hose clamp 1 comprises generally a base member 2 and an actuating member 3. The actuating member 3 of the clamp 1 is movable relative to the base member 2 for clamping a flexible hose or tubing 4 to stop the flow of liquid through the hose or tubing. The members 2 and 3 of the clamp 1 are preferably made of a suitable plastic which is moldable to form the members.

The base member 2 comprises generally a channel section member having opposed, generally parallel side flanges 5 connected by an intermediate web portion 6. The longitudinal channel or groove 7 formed in the base member 2 between the flanges 5 is adapted to receive the hose or tubing 4 for clamping.

The actuating member 3 operable within the channel 7 of base member 2 comprises generally a T-section member having a central leg 8 which serves as an actuating lever and a cross-arm 9 which extends generally equidistantly on opposite sides of the central leg. At least the cross-arm 9 of member 3 extends laterally to approximate the width of channel 7 and is movable therein as will be described hereinafter.

Opposed journal projections 10 extend laterally outward from the respective ends of member 3 at the intersection between the central leg 8 and the cross-arm 9. The opposed projections 10 of member 3 are rotatably disposed within the corresponding transversely aligned slots 11 provided in the opposed side flanges 5 of the base member 2.

Figure 3:
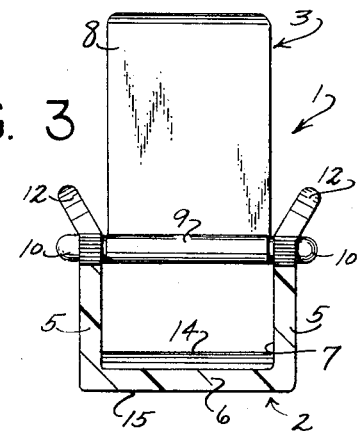
FIG. 3 is a sectional view of the clamp of FIG. 2.

The side flanges 5 of base member 2 may be generally triangular when viewed from the side, as shown, with slots 11 being disposed generally centrally of the lenfth of the member. The slots 11 are spaced from the apex or pinnacle of the respective triangular side flanges 5 and extend generally normal to the web portion 6 of member 2. The slots 11 continue or open through the web portion 6 of member 2 as generally shown in FIG. 1 so that the slots may be formed during the molding operation by slot forming members or standing cores which are movable perpendicularly to the web portion making it possible for a given size molding die to have a greater number of impression cavities. The pinnacle portion 12 of side flanges 5 beyond the slots 11 bend or flare outwardly, as best shown in FIG. 3, to provide for greater ease of assembly as will be further described hereinafter.

One factor which contributes to the relatively low cost of hose clamp 1 is the capability for machine assembly of the clamp in place of the more usual and more costly manual assembly. For assembly purposes, it is necessary that the flanges 5 of the base member 2 be spread apart so that the journal projections 10 on the actuating member 3 can be placed into the opposed base member slots 11. During machine assembly of the clamp 1, the actuating member journal projections 10 are brought into engagement with the corresponding flared pinnacle portions 12 of the base member flanges 5, and with the application of pressure between the base member 2 and actuating member 3 the flanges 5 are forced apart sufficiently to enable the projections 10 to engage within the slots 11. The material selected for the base member 2 must have sufficient elasticity to provide for the spreading apart of flanges 5 during assembly of clamp 1 followed by a general restoration of the flanges to their original position to maintain the members 2 and 3 in their assembled relation.

Figure 2:
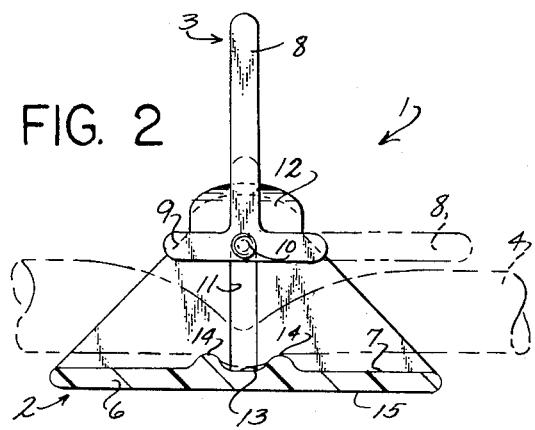
FIG. 2 is a sectional elevation showing the hose clamp in the unclamped position and in phantom lines shows a position for clamping the hose.

In assembled relation of the clamp 1, the tubing 4 rests in the channel or groove 7 of base member 2 intermediate the web portion 6 and the actuating member 3. In the unclamped position of actuating member 3, the elastic or flexible tubing 4 bears against the actuating member cross-arm 9 to maintain the journal projections 10 in the end portions of the corresponding slots 11 spaced from the base member web portion 6. To effect a clamping of the tubing 4, the actuating member 3 may be rotated in either direction from the unclamped position as generally indicated by the arrows in FIG. 2. When the actuating lever 8 is rotated in a given direction for clamping, the journal projections 10 are fulcrumed against the end of the slots 11 and a corresponding end of the cross-arm 9 is actuated to progressively pinch the tubing 4. As generally indicated by phantom lines in FIG. 2, the clamping action to preclude liquid flow through the tubing 4 is concluded when the actuating lever 8 is rotated approximately 90°. In the clamped condition the corresponding clamping end of the cross-arm 9 is radially aligned with the laterally extending trough 13 formed between the pair of longitudinally spaced, laterally extending ribs 14 provided on the web portion 6 of the base member 2 and generally symmetrically relative to the slots 11. With the clamping end of cross-arm 9 disposed between and exerting a clamping pressure against the respective ribs 14, the actuating member 3 is retained in the clamping position until forcibly removed from that position.

Ordinarily only one hand is required to actuate the clamp 1 to effect clamping or unclamping while the other hand remains free and/or available for other chores. The generally flat surface 15 presented on the base member web portion 6 on the side opposite from the channel or groove 7 may be brought to bear against any suitable adjacent surface in the clamp environment to provide greater stability for the clamp 1 during actuation of member 3.

Figure 4:
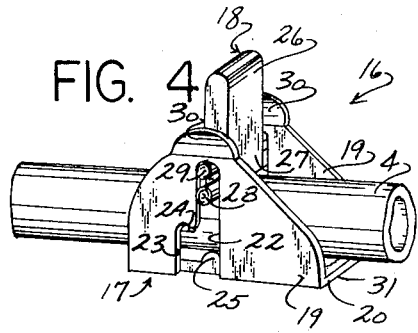
FIG. 4 is a perspective view of a further embodiment of a hose clamp.
Figure 5:
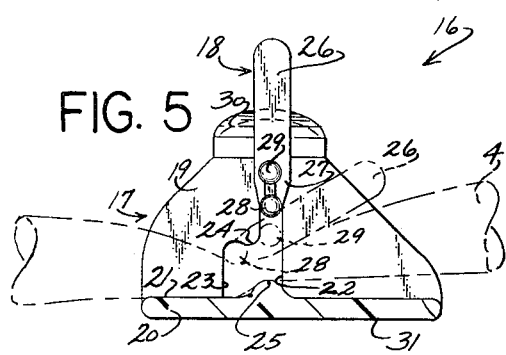
FIG. 5 is a sectional elevation of the clamp of FIG. 4 and shows the clamp in the unclamped position and in phantom lines illustrates the position for clamping the hose.
Figure 6:
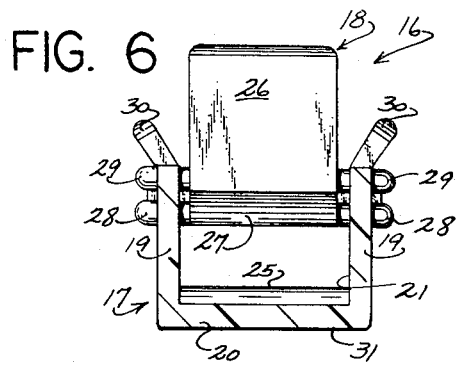
FIG. 6 is a sectional view of the clamp of FIG. 5.

Referring to the embodiment of FIGS. 4 through 6, the hose clamp 16 generally comprises a base member 17 and an actuating member 18 movable relative to member 17 to effect clamping of the hose or tubing 4 to preclude flow through the hose or tubing. As in the case of the embodiment of FIGS. 1-3, the clamp members 17 and 18 are preferably made of a suitable plastic which is moldable to form the members.

The base member 17 comprises generally a channel section member having generally parallel side flanges 19 connected by the intermediate web portion 20 and defining the longitudinally extending channel or groove 21 adapted to receive the hose or tubing 4 for clamping. The spaced side flanges 19 may be generally triangular, as shown, and have transversely aligned slots 22 intermediate the length of the flanges. The respective slots 22 are spaced from the apex or pinnacle of the triangular side flanges 19 and extend generally normal to the web portion 20 of base member 17. Adjacent to the web portion 20 the respective slots 22 are enlarged by offset portions 23 in a given direction longitudinally relative to base member 17 and which provide the respective flanges 19 with transversely aligned camming projections 24 intermediate the respective slots and their corresponding offset portions. The respective slots 22 and offset portions 23 continue or open through the web portion 20 of base member 17 so that their formation may be by standing cores movable perpendicularly relative to the web portion during the molding operation whereby a given size molding die can provide for a greater number of impression cavities. The web portion 20 of base member 17 is further provided with a transversely extending rib 25 which projects into the channel or groove 21 generally in alignment with the slots 22.

The actuating member 18 may be a plate-like member, as shown, having one end portion 26 adapted for manipulation and an opposed end portion 27 adapted to effect clamping of the hose or tubing 4. Member 18 is operatively disposed in the channel 21 with at least the clamping end portion 27 having a width approximating that of the channel and extending between the flanges 19 of base member 17. Actuating member 18 is provided with opposed cam follower projections 28 which extend laterally outward at the end of the clamping portion 27 and is adapted to project through the corresponding slots 22 of the opposed flanges 19 in the assembled clamp 16. Spaced from the cam follower projections 28, the clamping portions 27 of member 18 further includes opposed journal projections 29 which are also adapted to project through the corresponding slots 22 of the opposed flanges 19 in the assembled clamp 16.

Machine assembly is also contemplated for the hose clamp 16 and to facilitate such assembly the pinnacle portions 30 of the opposed flanges 19 beyond the slots 22 bend or flare outwardly as best shown in FIG. 6. During assembly of the clamp 16, the cam follower projections 28 of member 18 are brought into engagement with the opposed flared pinnacle portions 30 of the base member flanges 19 and by the application of pressure of the flanges are momentarily forced apart sufficiently to enable the projections 28 and 29 to engage within the opposed slots 22.

In assembled relation of the clamp 16, the flexible hose 4 bears against the clamping end portion 27 of the actuating member 18 to maintain member 18 generally upright in the unclamped position with the projections 28 and 29 disposed in the end portions of the respective slots 22 adjacent to the flared portions 30 of flanges 19.

To effect clamping of hose 4, the actuating member 18 is initially moved relative to the slots 22 toward the web portion of the base member 17 to compress the hose 4 between the actuating member and rib 25. Thereafter the manipulating end of member 18 is rotated relative to the base member 17 in the direction opposite to the slot offset portions 23 with the journal projections 29 rotating correspondingly and bearing against the side of the respective slots 22 to force the respective cam follower projections 28 over the corresponding camming projections 24 and into the offset portions 23 of the slots. The clamping pressure on hose 4 retains the cam follower projections 28 in the slot offset portions 23 to maintain the clamped condition until the actuating member is forcibly moved to disengage the cam follower projections 28 from the slot offset portions. As in the case of clamp 1, ordinarily only one hand suffices for actuating the clamp 16. Also like clamp 1, the base member web portion 20 on the side opposite from channel 21 is generally flat at 31 so that the clamp 16 may be brought to bear against suitable adjacent surfaces to provide greater stability during actuation of member 18.

Various modes of carrying out the invention are contemplated as being within the scope of the following claims which particularly point out and distinctly claim the subject matter which is regarded as the invention.

I claim:

1. In a clamping device for flexible hose, a channel-section base member having opposed resilient flanges connected by an intermediate web portion and adapted to receive a flexible hose therein, each of said opposed flanges having a slot therein with the slots being transversely aligned, the upper extremities of said slots being spaced a given distance from the upper edge of the corresponding flange and extending generally normal to the web portion of said base member, and an actuating member operatively disposed relative to said base member and having a clamping end portion, said clamping end portion extending between the flanges of said base member and having opposed, transversely aligned projections engageable within the corresponding slots of the base member flanges, said projections being movable within the slots with actuation of the actuating member relative to the base member to selectively clamp and unclamp the flexible hose, said base member flanges having an outwardly flared portion generally extending from the slot to the upper edge thereof, said flared portion of said flanges being engageable by the actuating member projections during assembly so that with an application of pressure between the actuating member and base member the flanges are forced to elastically spread apart to enable the projections to slide over the corresponding flared portions of said flanges and engage within the opposed slots, the outwardly flared portion of each flange extends generally from the upper extremity of the slot to the corresponding upper edge of the flange, the actuating member comprises a generally T-shaped member having a manipulatable central leg portion and a cross arm clamping end portion with said aligned slot engaging projections being disposed generally at the intersection of said portions, said actuating member being selectively actuatable in either direction from an unclamped position by manipulation of the central leg portion to effect a clamping of the flexible hose between the cross-arm clamping end portion and the base member, the base member web portion is provided with a pair of longitudinally spaced, transversely extending ribs which project into the hose channel, said ribs being generally symmetrically spaced relative to the slots in the respective flanges and forming a transversely extending through therebetween generally aligned with the slots, with either arm of the cross-arm clamping end portion disposed in the trough and exerting a clamping pressure on the flexible hose against the respective ribs the actuating member is retained in the clamping position until forcibly removed from that position.

2. The invention as set forth in claim 1 wherein the surface of the base member web portion on the side opposite from the hose channel is generally flat and may be brought to bear against any suitable adjacent surface to stabilize the clamping device during operation thereof.

3. The invention of claim 1, wherein the lower extremity of each slot terminates adjacent the base member.

* * * * *